US011497193B2

(12) United States Patent
Yim et al.

(10) Patent No.: US 11,497,193 B2
(45) Date of Patent: Nov. 15, 2022

(54) TOP-TYPE CAT DISH

(71) Applicant: MONDOMIO.CO.LTD, Daegu (KR)

(72) Inventors: Eunjin Yim, Gyeongsan-si (KR); Kyungheui Jin, Gyeongsan-si (KR)

(73) Assignee: MONDOMIO.CO.LTD, Daegu (KR)

(*) Notice: Subject to any disclaimer, the term of this patent is extended or adjusted under 35 U.S.C. 154(b) by 0 days.

(21) Appl. No.: 17/256,973

(22) PCT Filed: Aug. 3, 2020

(86) PCT No.: PCT/KR2020/010199
§ 371 (c)(1),
(2) Date: Dec. 29, 2020

(87) PCT Pub. No.: WO2021/029584
PCT Pub. Date: Feb. 18, 2021

(65) Prior Publication Data
US 2022/0159926 A1  May 26, 2022

(30) Foreign Application Priority Data

Aug. 14, 2019  (KR) .................. 10-2019-0099266

(51) Int. Cl.
*A01K 5/01* (2006.01)
(52) U.S. Cl.
CPC .................. *A01K 5/0135* (2013.01)
(58) Field of Classification Search
CPC .................. A01K 5/00; A01K 7/00
See application file for complete search history.

(56) References Cited

U.S. PATENT DOCUMENTS

D745,228 S * 12/2015 Scaba .................. D30/129

FOREIGN PATENT DOCUMENTS

| JP | 2015119662 A | 7/2015 |
| KR | 200429946 Y1 | 5/2008 |
| KR | 20180081324 A | 7/2018 |
| KR | 20180114779 A | 10/2018 |
| KR | 102094433 B1 | 3/2020 |

OTHER PUBLICATIONS

Thomas Heatherwick, Magis Spun Chair, Apr. 25, 2018 https://web.archive.org/web/20180425045630/https://www.hermanmiller.com/products/seating/lounge-seating/magis-spun-chair/(Year: 2018).*
Young Woo, K., "[MDC] Review of 'Hygge Bowl', a transformative snack bowl with a personality," IT Donga Website, Dec. 15, 2015, 7 pages. (Submitted with Machine Translation.

* cited by examiner

*Primary Examiner* — Joshua E Rodden
*Assistant Examiner* — Henry Hooper Mudd
(74) *Attorney, Agent, or Firm* — McCoy Russell LLP

(57) ABSTRACT

The present invention relates to a top-type cat dish, and more particularly to, top-type cat dish in which a top part provided in a bowl part allows the cat to eat food by inclining the cat dish according to a cat's body structure, a support part having an angle provided at an edge minimizes shaking, and an uneven portion formed inside the bowl prevents food from slipping so that the cat may comfortably eat food.

4 Claims, 3 Drawing Sheets

TOP-TYPE CAT DISH

CROSS REFERENCE TO RELATED APPLICATIONS

The present application is a U.S. National Phase of International Application No. PCT/KR2020/010199 entitled "TOP-TYPE CAT DISH," and filed on Aug. 3, 2020. International Application No. PCT/KR2020/010199 claims priority to Korean Patent Application No. 10-2019-0099266 filed on Aug. 14, 2019. The entire contents of each of the above-listed applications are hereby incorporated by reference for all purposes.

TECHNICAL FIELD

The present invention relates to a top-type cat dish, and more particularly, to a cat dish including a top part.

BACKGROUND

As society has developed, the number of people who raise companion animals has increased rapidly. Accordingly, companion animal-related products for companion animals have been upgraded and subdivided and tableware for companion animals that have various functions and shapes and are formed of various materials has been released. However, many products such as automatic feeding machines and slow feed tableware, and the like are specialized for dogs, while the number of cat-only items taking into account biological and behavioral characteristics of cats is significantly relatively small.

Dogs and cats need to have different bowl shapes because their face shapes, bones, head and tooth structures, as well as skeletons, and food to eat are different, and bowls having a height at which cats may eat food in a comfortable and stable posture, without lowering their necks, need to be used. In addition, cats mainly eat dry food; however, they also eat wet food, and thus bowls for cats may need to have a shape allowing cats to easily eat dry food in a grain form and wet food in a porridge form as well.

As a related art of a food container for cats, Korean Patent Laid-Open Publication 10-2018-0114779 ("Semi-automatic cover-type cat food container holder capable of adjusting angle and height", published on Oct. 19, 2018, referred to as "related art" hereinafter) discloses a cat dish with adjustable angle and height.

However, the related art has a structure in which the cat should press a footboard with its paws to open a closed dish to eat food and the cat's whiskers touch the dish, which may give stress to the cat. In addition, food may slip when the cat eats food with its small tongue and food may gather to the corners when the cat licks food.

RELATED ART DOCUMENT

Patent Document

Korean Patent Laid-Open Publication No. 10-2018-0114779 (published on Oct. 19, 2018)

DISCLOSURE

Technical Problem

An object of the present invention is to provide a top-type cat dish (i.e., a top-type cat tableware) including a top part provided at a lower portion of the dish to allow the cat to eat in a comfortable and stable posture.

Technical Solution

In one general aspect, a top-type cat dish includes: a bowl part having a concave recess and having a predetermined height such that an inner diameter thereof decreases from top to bottom; and a top part integrally connected to the bowl part and having an inverted conic shape so as to be inclined.

The top part may further include a support part supporting a lower portion of the bowl part.

The support part may have a plurality of angles formed at an edge thereof. More specifically, the support part may be disposed between the bowl part and the top part, have a plurality of angles formed at the edge thereof, and have a polygonal plate shape having a diameter larger than that of the bowl part.

According to such a configuration, when the top-type cat dish is placed on the ground, the bowl part may be disposed to be inclined with respect to the ground by the top part but supported by the edge of the support part, whereby the bowl part may be fixed to and disposed on the ground, while securing a predetermined angle of inclination.

In addition, in the top-type cat dish, a lower portion of the bowl part and an upper surface of the support part are connected to form gentle curved surface and a lower surface of the support part and an upper portion of the top part are connected to form a gentle curved surface, whereby the bowl part, the top part, and the support part may be integrally formed.

In addition, the bowl part may have an uneven portion therein.

In addition, depressions and protrusions may be formed at a joint of the bowl part and the support part and at a joint of the support part and the top part.

In addition, the top-type cat dish may be formed of silicone.

Advantageous Effects

With the top-type cat dish of the present invention according to the configuration as described above, since the bowl part and the top part are coupled to be inclined, the cat may eat food in a comfortable posture.

In addition, according to the present invention, since the bowl part has a predetermined height so that an inner diameter thereof decreases from top to bottom, an internal height of the dish may be determined by setting a height to fit a body structure of the cat, so that the cat may eat food in a comfortable posture without lowering its neck, and since the cat's whiskers, an important sensory organ of the cat, do not touch food, stress may be prevented.

In addition, according to the present invention, the uneven portion in the bowl part may prevent food from slipping when the cat eats dry and wet food.

In addition, according to the present invention, since the cat dish is formed of a tritan material or platinum catalyst silicone without an environmental hormone component, the cat dish is light in weight and is not easily broken, and may be sterilized with hot water so as to be used comfortably.

In addition, according to the present invention, there is an advantage that the bowl part and the support part are formed of a recyclable material.

In addition, according to the present invention, the depressions and protrusions formed at the joint of the bowl part and the support part and the joint of the support part and the top part improve rigidity and distribute a load so that balance of the top-type cat dish is stable.

DESCRIPTION OF REFERENCE NUMERAL

Figure 1:
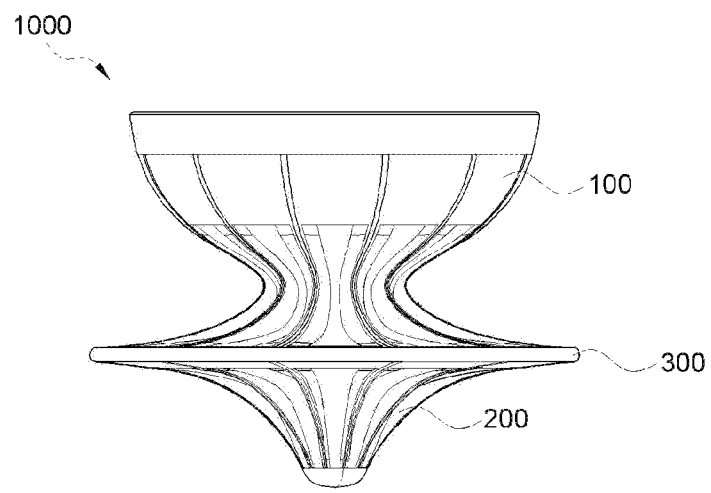
FIG. 1 is a front view of a top-type cat dish according to an exemplary embodiment of the present invention.

1000: top-type cat dish
100: bowl part
110: uneven portion
111: first uneven portion
112: second uneven portion
200: top part
300: support part 300: support part

BEST MODE

Hereinafter, a technical idea of the present invention will be described in detail with reference to the accompanying drawings. Terms or words used in the specification and claims should not be limited and construed as common or dictionary meanings, and should be construed as meanings and concepts according to the technical spirit of the present invention based on the principle that the inventor can appropriately define the concept of each term for describing the invention in the best way.

The exemplary embodiment described in the present disclosure and the configuration illustrated in the drawings are merely the most preferred embodiment of the present invention, rather than representing all the technical concepts of the present invention, so the present invention is meant to cover all modifications, similarities, and alternatives which are included in the spirit and scope of the present invention at the time of filing of the present invention.

Hereinafter, the technical idea of the present invention will be described in more detail using the accompanying drawings. The accompanying drawings are only examples shown to describe the technical idea of the present invention in more detail, and thus the technical idea of the present invention is not limited to the form of the accompanying drawings.

DETAILED DESCRIPTION

Figure 2:
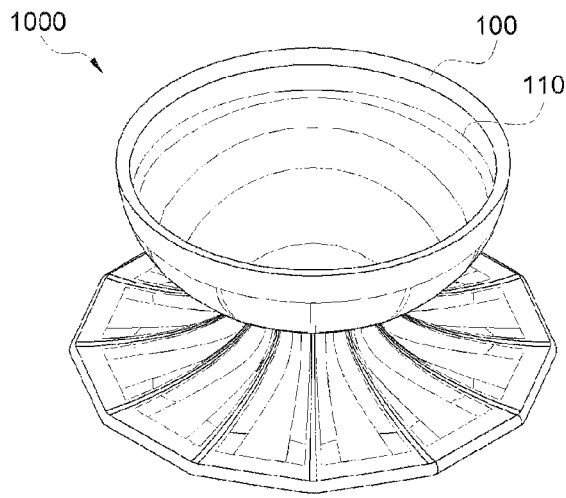
FIG. 2 is a top view of a top-type cat dish according to an exemplary embodiment of the present invention.
Figure 3:
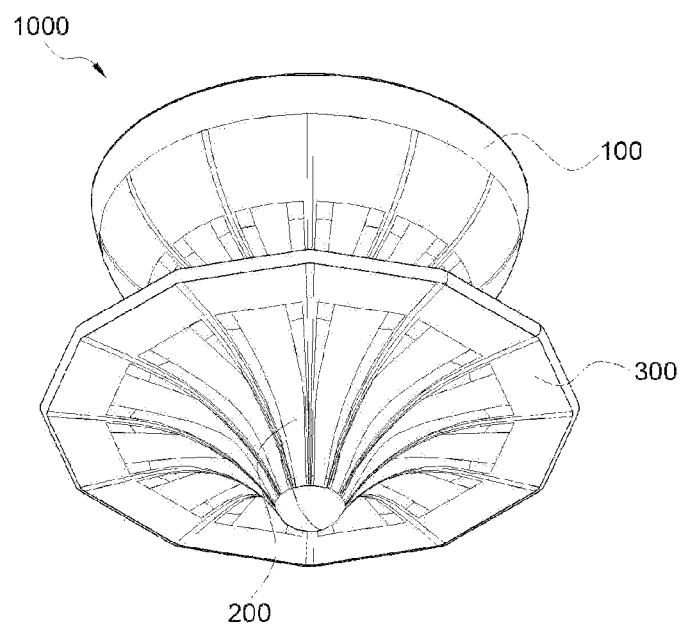
FIG. 3 is a bottom view of a top-type cat dish according to an exemplary embodiment of the present invention.

FIG. 1 is a front view of a top-type cat dish 1000 according to an exemplary embodiment of the present invention, FIG. 2 is a top view of the top-type cat dish 1000 according to an exemplary embodiment of the present invention, and FIG. 3 is a bottom view of the top-type cat dish 1000 according to an exemplary embodiment of the present invention.

As shown in FIGS. 1 to 3, the top-type cat dish 1000 according to an exemplary embodiment of the present invention (hereinafter referred to as "cat dish 1000") may include a bowl part 100, a top part 200, and a support part 300, and may additionally include an uneven portion 110.

The bowl part 100 has a concave recess and a predetermined height so that an inner diameter decreases from the top to the bottom. In detail, the bowl part 100 has a predetermined height and a circumferential length optimized for the cat's face shape, size, and oral structure to have a depth of the inside of the dish at which the cat may eat in a comfortable posture without lowering its neck. In other words, in an exemplary embodiment, the bowl part 100 of the present invention may have a shallow depth and a large width to accommodate the cat's face and oral structure. In addition, the bowl part 100 is formed such that the cat's whiskers, which are an important sensory organ of the cat, do not enter the inside of the bowl part 100 so as not to give stress to the cat.

In addition, an internal corner of the bowl is formed rounded so that the cat may easily and cleanly eat even when eating wet food. In addition, the uneven portion 110 is included in the bowl part 100, which will be described in more detail in FIG. 4 below.

The top part 200 is integrally connected to the bowl part 100 and is formed in an inverted conical shape so as to be inclined in all directions. In the cat dish 1000, the bowl part 100 is inclined by the top part 200 so that the cat may eat without lowering its head much, so that use convenience of the dish 1000 may be improved. Since the cat dish 1000 is rotated 360 degrees, the cat may eat food according to a movement of the top part 200. Through this, the cat's activity and hunting instinct are awakened while the cat eats food with the cat dish 1000 so that the cat may eat interestingly and relieve stress by playing tracking against the cat dish 1000.

In addition, an edge of an end portion of the top part 200 may be rounded so that the cat dish 1000 is rotated smoothly.

The support part 300 supports a lower portion of the bowl part 100 and is formed on an upper portion of the top part 200. That is, the support part 300 is disposed between the bowl part 100 and the top part 200 and is formed to inhibit wobbling of the bowl part 100 due to rotation of the top part 200. More specifically, the support part 300 may have a polygonal plate shape having a plurality of angles formed at the edge and having a diameter larger than a diameter of the bowl part 100. Accordingly, when the top-type cat dish 1000 is placed on the ground, the bowl part 100 is disposed to be inclined with respect to the ground by the top part 200 and supported by the edge of the support part 300, whereby the bowl part 100 may be fixedly disposed on the ground, while securing a predetermined inclination angle. The plurality of angles formed at the edge of the support part 300 not only minimizes wobbling of the bowl due to the top part 200 but also allows the internal height (depth) of the bowl part 100 to be adjusted.

The reason why the top-type cat dish 1000 is stably fixed on the ground by forming an angle on the support part 300 will be described in more detail as follows. If the support part 300 is formed in, for example, a circular shape without an angle, the top-type cat dish 1000 may roll and rotate around the vertex of the top part 200 and the cat may not be able to eat food properly due to the wobbling. However, when an angle is formed on the support part 300, the top-type cat dish may be stably fixed to the ground by the angle, so that the cat may stably and comfortably eat food. In addition, while the cat eats food, the cat dish 1000 may be pushed slide, but such a sliding phenomenon may be minimized and the cat may eat food stably.

Meanwhile, the bowl part 100, the top part 200, and the support part 300 are all integrally formed as shown in the drawings. Animals, including cats, are more vulnerable than humans in properly understanding, judging, and controlling certain functions. Therefore, if an article for an animal may be deformed or a plurality of parts are formed to be assembled and disassembled, there is a high possibility that the animal using the article is not able to properly understand and handle the article as originally intended. For example, if a shape is formed to be deformable, there is a risk of deformation at an unexpected point in time as the cat accidentally presses it with its front paw while eating, and in this case, the cat may be surprised and be reluctant to use the dish again or secondary discomfort may occur, such as food splashing on the floor. In addition, especially in the case of an active cat, there is a high risk of damage or breakdown by applying excessive external force when an article including multiple parts is provided. Therefore, the top-type cat dish 1000 may be rarely deformed and may be formed as an integral type rather than an assembled form of several parts.

Meanwhile, if a connecting portion of each part is in a sharp shape, there is a risk of injuring the cat, and thus, as shown in the drawings, a lower portion of the bowl part 100 and an upper surface of the support part 300 may be connected to form a gentle curved surface and a lower surface of the support part 300 and an upper portion of the top part 200 may be connected to form a gentle curved surface. When each part is formed integrally in such a form, the top-type cat dish 1000 may have depressions and protrusions as a joint of the bowl part 100 and the support part 300 and a joint of the support part 300 and the top part 200 are sunken. Accordingly, a load of the bowl part 100 may be distributed to the support part 300 and a load transmitted to the support part 300 is distributed to the center of the top part 200, so that rigidity of an overall configuration of the cat dish 1000 may be reinforced and the balance of dish may be maintained.

In addition, the cat dish 1000 may be formed of an eco-friendly tritan material (baby bottle material), platinum catalyst silicone, etc., and of course, a material of the cat dish 1000 of the present invention is not limited and the cat dish 1000 may be formed of various materials. As the cat dish 1000 is formed of a tritan material and platinum catalyst silicone, the cat dish 1000 is formed of a light and non-breakable material and maintains its shape even at high temperatures and may be sterilized in boiling water or a dishwasher, so that the cat may have a hygienic and pleasant meal. In addition, since the cat dish 1000 is a bowl for eating food, a material without environmental hormones may be used. In addition, since the platinum catalyst silicone is a soft and flexible material that cats prefer, it may help cats have a pleasant meal. Here, "being flexible" here refers to a degree of flexibility that provides a soft sensation when touched or absorbs a shock with a little elasticity when subjected to a strong impact and does not refer to a degree of flexibility that significantly changes in shape (see the description of the disadvantages in case of a significant change in shape of animal products).

Figure 4:
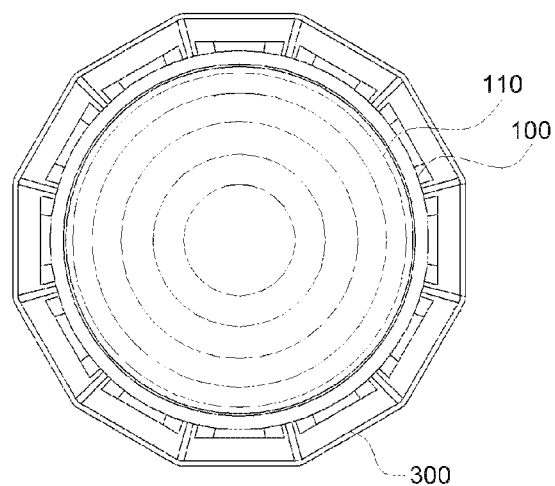
FIG. 4 is a view showing a bowl part of a top-type cat dish according to an exemplary embodiment of the present invention.
Figure 5:
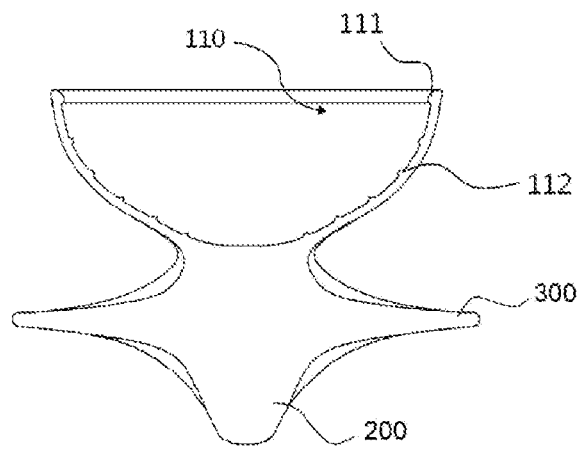
FIG. 5 is a cross-sectional view of a top-type cat dish according to an exemplary embodiment of the present invention.

FIG. 4 is a view showing an inner shape of the bowl part 100 of the top-type cat dish 1000 according to an exemplary embodiment of the present invention, and FIG. 5 is a cross-sectional view of the top-type cat dish 1000 according to an exemplary embodiment of the present invention. As shown in FIGS. 4 and 5, the bowl part 100 according to an exemplary embodiment of the present invention has an uneven portion 110 formed therein. The uneven portion 110 may have a concavo-convex pattern, providing an effect of preventing food from slipping when the cat eats food with a small, short tongue thereof. In addition, since the inside of the bowl is rounded in corners, there is an advantage that wet food with a lot of moisture may be eaten cleanly.

In more detail, referring to the cross-sectional view of FIG. 5, the uneven portion 110 formed on an upper end of the bowl part 100 includes a first uneven portion 111 and a second uneven portion 112.

The first uneven portion 111 has the largest unevenness in the uneven portion 110 and is formed in a large and thick concavo-convex shape to prevent food contained in the tableware from overflowing to the outside. The second uneven portion 112 refers to unevenness of all portions except for the first uneven portion 111. In detail, the second uneven portion 112 is formed in the shape of a concavo-convex smaller than the first uneven portion 111 to prevent food from sliding to cause inconvenience when the cat eats wet food with a short tongue.

In addition, referring to FIGS. 4 and 5, a plurality of angles are formed at the edge of the support part 300, and in the present invention, 12 angles may be formed. However, the present invention is not limited thereto and the support part 300 may be formed in various forms.

In addition, since the support part 300 is formed between the bowl part 100 and the top part 200, the support part 300 may be prevented from being inclined in spite of rotation of the top part 200 so that the cat may eat conveniently without spilling food in the bowl part 100.

Figures 6A, 6B:
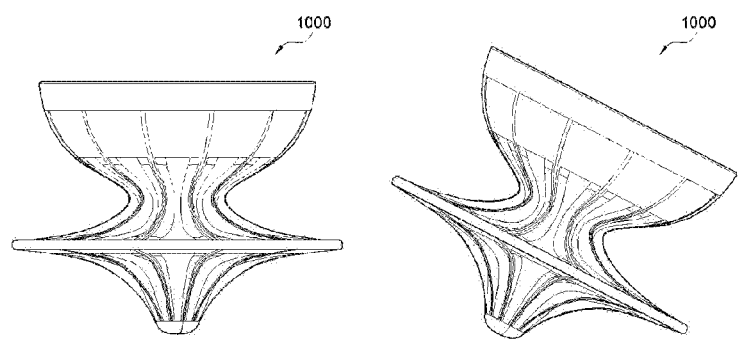
FIGS. 6A and 6B are views showing a movement of a top-type cat dish according to an exemplary embodiment of the present invention.

FIG. 6 shows a view showing a movement of the top-type cat dish 1000 according to an exemplary embodiment of the present invention. This will be described through FIGS. 6A and 6B with reference to FIG. 6.

First, the top-type cat dish 1000 has the bowl part 100 at the top, and the top part 200 below is integrally connected with the bowl part 100, so that the dish 1000 may be inclined or rotated by the top part 200 according to a body structure of the cat when the cat eats food.

FIG. 6A shows the cat dish 1000 arbitrarily stood right, but the cat dish 1000 of the present invention cannot stand. In other words, FIG. 6A is a front view of the cat dish 1000, assuming that it is stood right.

In FIG. 6B, the cat dish 1000 is inclined by the top part 200. When the cat or a person touches the cat dish 1000 or when the cat eats food, the cat dish 1000 is inclined as shown in FIG. 6B. As such, referring to FIG. 6B, the cat dish 1000 may be rotated by the top part 200 and may be stably supported on the ground at an angle formed on the support part 300. Since the support part 300 is in contact with the ground, the cat may eat comfortably by maintaining a certain inclination and a depth of the bowl.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention not only maximizes convenience of use in the position of the cat by allowing the cat to take a comfortable posture when eating food but also maximizes convenience of use in the position of a cat owner by facilitating washing of the dish, thus promoting considerable marketability in the animal products industry.

The invention claimed is:

1. A top-type cat dish comprising:
   a bowl part having a concave recess and having a predetermined height such that an inner diameter thereof decreases from top to bottom;
   a top part integrally connected to the bowl part and having an inverted conic shape so as to be inclined, and
   a polygonal plate shaped support part which is disposed between the bowl part and the top part, the polygonal plate shaped support part having a plurality of angles at an edge and having a diameter larger than a diameter of the bowl part,
   wherein, when the top-type cat dish is placed on a ground, the bowl part is disposed to be inclined with respect to the ground by the top part and supported by the edge of the support part, whereby the bowl part configured to be fixedly disposed on the ground, while securing a predetermined inclination angle, and
   wherein the bowl part, the top part, and the support part are all integrally formed and a lower portion of the bowl part and an upper portion of the support part are connected to form a gentle curved surface and a lower portion of the support part and an upper portion of the top part are connected to form a gentle curved surface.

2. The top-type cat dish of claim 1, wherein the bowl part has an uneven portion therein.

3. The top-type cat dish of claim 1, wherein depressions and protrusions are formed at a joint of the bowl part and the support part and at a joint of the support part and the top part.

4. The top-type cat dish of claim 1, wherein the top-type cat dish is formed of silicone.

* * * * *